United States Patent
Guida et al.

(10) Patent No.: US 6,303,193 B1
(45) Date of Patent: *Oct. 16, 2001

(54) PROCESS FOR FABRICATING A TOOL USED IN ELECTROCHEMICAL MACHINING

(75) Inventors: Renato Guida, Wynantskill; Kevin Matthew Durocher, Waterford; Thomas Bert Gorczyca, Schenectady; Bin Wei, Mechanicville, all of NY (US)

(73) Assignee: General Electric Company, Schnectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,664

(22) Filed: Nov. 5, 1998

(51) Int. Cl.$^7$ ........................................ B05D 3/00
(52) U.S. Cl. .................. 427/555; 427/105; 427/117; 427/271; 427/596; 428/35.8; 428/221; 428/457
(58) Field of Search ..................... 427/555, 596, 427/105, 117, 271; 428/35.8, 221, 457

(56) References Cited

U.S. PATENT DOCUMENTS

| | | |
|---|---|---|
| 3,803,018 | 4/1974 | Andrews . |
| 3,880,745 * | 4/1975 | Shaw . |
| 3,984,911 | 10/1976 | Krug et al. . |
| 4,002,518 | 1/1977 | Shaw . |
| 4,250,011 * | 2/1981 | Capello et al. . |
| 4,504,354 * | 3/1985 | George et al. . |
| 4,690,737 | 9/1987 | Vishnitsky . |
| 4,907,765 * | 3/1990 | Hirschel et al. . |
| 5,196,376 * | 3/1993 | Reche . |
| 5,306,401 | 4/1994 | Fierkens et al. . |
| 5,320,721 | 6/1994 | Peters ................................ 204/129.1 |
| 5,322,599 | 6/1994 | Peters ................................ 204/129.2 |
| 5,738,777 | 4/1998 | Bliek et al. . |
| 6,200,439 * | 11/1998 | Wei et al. . |

OTHER PUBLICATIONS

U.S. Pat. application "Method and Tool for Electrochemical Machining" by B. Wei, et al., Ser. No.: 09/187,663 filed Nov. 5, 1998.
IBM Technical Disclosure Bulletin, 4–94, vol. 37, pp. 1–2.*

* cited by examiner

*Primary Examiner*—Bernard Pianalto (57) ABSTRACT

A process for producing a pattern in the surface coating of an electrode used in an electrochemical machining process comprises the steps of providing a cylinder having a body composed of an electrically conductive material and a surface coating of an electrically insulating material and exposing the surface coating of the cylinder to a source of light in accordance with the pattern. Locators(s) may optionally be formed on the surface of the cylinder to assist in positioning the electrode in a predrilled hole.

19 Claims, 5 Drawing Sheets

PROCESS FOR FABRICATING A TOOL USED IN ELECTROCHEMICAL MACHINING

CROSS REFERENCE TO RELATED APPLICATIONS

This application is related to commonly assigned B. Wei et al., "A Method and Tool for Electrochemical Machining," U.S. application Ser. No. 09/187,663, U.S. Pat. No. 6,200,439, which is filed concurrently herewith and is herein incorporated by reference.

FIELD OF THE INVENTION

This invention relates to a method for fabricating a tool used in electrochemical machining. More particularly, the invention relates to a method of producing a desired pattern of insulating material on the surface of the tool.

BACKGROUND OF THE INVENTION

A specialized adaptation of electrochemical machining, known as shaped-tube electrochemical machining (STEM), is used for drilling small, deep holes in electrically conductive materials. STEM is a noncontact electrochemical drilling process which can produce holes with aspect ratios as high as 300:1. It is the only known method which is capable of manufacturing the small, deep holes used for cooling blades of efficient gas turbines.

The efficiency of a gas turbine engine is directly proportional to the temperature of turbine gases channeled from the combustor of the engine and flowing over the turbine blades. For example, for gas turbine engines having relatively large blades, turbine gas temperatures approaching 1500° C. (2,700° F.) are typical. To withstand such high temperatures, these large blades are manufactured from advanced materials and typically include state-of-the-art type cooling features.

A turbine blade is typically cooled using a coolant such as compressor discharge air. The blade typically includes a cooling hole through which the air passes. A further design advancement has been the addition of internal ridges in the cooling hole to effect turbulent flow through the hole and increase cooling efficiency. Cooling features within the hole such as turbulence promoting ribs, or turbulators, thus increase the efficiency of the turbine.

The cooling holes commonly have an aspect ratio, or depth to diameter ratio, as large as 300:1, with a diameter as small as a few millimeters. The turbulators extend from sidewalls of the hole into the air passage about 0.2 millimeters (mm), for example.

The method currently used for drilling the cooling holes in turbine blades is a shaped-tube electrochemical machining (STEM) process. In this process, an electrically conductive workpiece is situated in a fixed position relative to a movable manifold. The manifold supports a plurality of drilling tubes, each of which are utilized to form an aperture in the workpiece. The drilling tubes function as cathodes in the electrochemical machining process, while the workpiece acts as the anode. As the workpiece is flooded with an electrolyte solution from the drilling tubes, material is deplated from the workpiece in the vicinity of the leading edge of the drilling tubes to form holes.

Turbulated ridges are formed in the cooling holes by a modification of the standard shaped-tube electrochemical machining (STEM) process for drilling straight-walled holes. One common method is termed cyclic dwelling. With this technique, the drilling tube is first fed forward, and then the advance is slowed or stopped in a cyclic manner. The dwelling of the tool which occurs when the feed rate is decreased or stopped creates a local enlargement of the hole diameter, or a bulb. The cyclic dwelling causes ridges to be formed between axially spaced bulbs. Cyclical voltage changes may be required. These ridges are the turbulators.

The cyclic dwelling method is very low in process efficiency compared to shaped-tube electrochemical machining (STEM) drilling of straight-walled holes because of the long time required for drilling each bulb individually by cyclic tool dwelling. The dwell time required to form a single bulb can be greater than the time for drilling an entire straight-walled hole.

U.S. Pat. No. 5,306,401 describes a method for drilling cooling holes in workpieces comprising turbulator blades which uses a complex tool resetting cycle for each turbulator in the hole. It, too, has low process efficiency, having even longer operating times for drilling the turbulator ridges than the cyclic dwelling method because of the time required to reset the electrode tool.

In addition, both the cyclic dwelling method and the method disclosed in U.S. Pat. No. 5,306,401 require that additional equipment be used with a standard STEM machine for control of machine ram accuracy, and electrolyte flow and power supply consistency, since these are crucial to hole quality. Failure to control the dimensions of the turbulated holes often leads to part rejection, adding significant manufacturing costs to the machining process.

An improved electrode tool has been developed which provides for convenient, cost effective machining of features in holes with large aspect ratios. Examples of the features which may be produced on workpieces using the tool are turbulators in cooling holes in turbine airfoils, rifling in gun barrels, and grooves in air bearings. The tool is disclosed in aforementioned B. Wei et al., "A Method and Tool for Electrochemical Machining," U.S. application Ser. No. 09/187,663.

With the improved electrode, it is possible to simultaneously machine as many bulbs as desired, in whatever configuration desired, while achieving a significant reduction in process time. Furthermore, no variation of process parameters such as feed rate or voltage is needed, and therefore, costly computer controls for the instrument are not required.

The improved electrode of the above referenced patent application is composed of a coated surface in a pattern defining the features to be machined in a predrilled hole in a workpiece. Using a lathe to grind a pattern in the coated surface is difficult due to the small diameter of the improved electrode (as small as 1 mm) and thin walls, where the tube is hollow (as thin as 0.25 mm) In addition, residues of dielectric material left in the ground areas can affect the quality of the features produced using the electrode.

Accordingly, there is a need for a new and improved method for fabricating an electrode for use in a shaped-tube electrochemical machining (STEM) process. In particular, there is a need for a method for fabricating an electrode having a surface coated in a complex pattern.

SUMMARY OF THE INVENTION

The present invention provides a process for producing a desired pattern on a surface of an electrode for use in an electrochemical machining process. The process includes providing a cylinder having a body composed of an electrically conductive material and a surface coating of an electrically insulating material, and exposing the insulating coating of the cylinder to a source of collimated light in accordance with the pattern.

DETAILED DESCRIPTION

Figure 1:
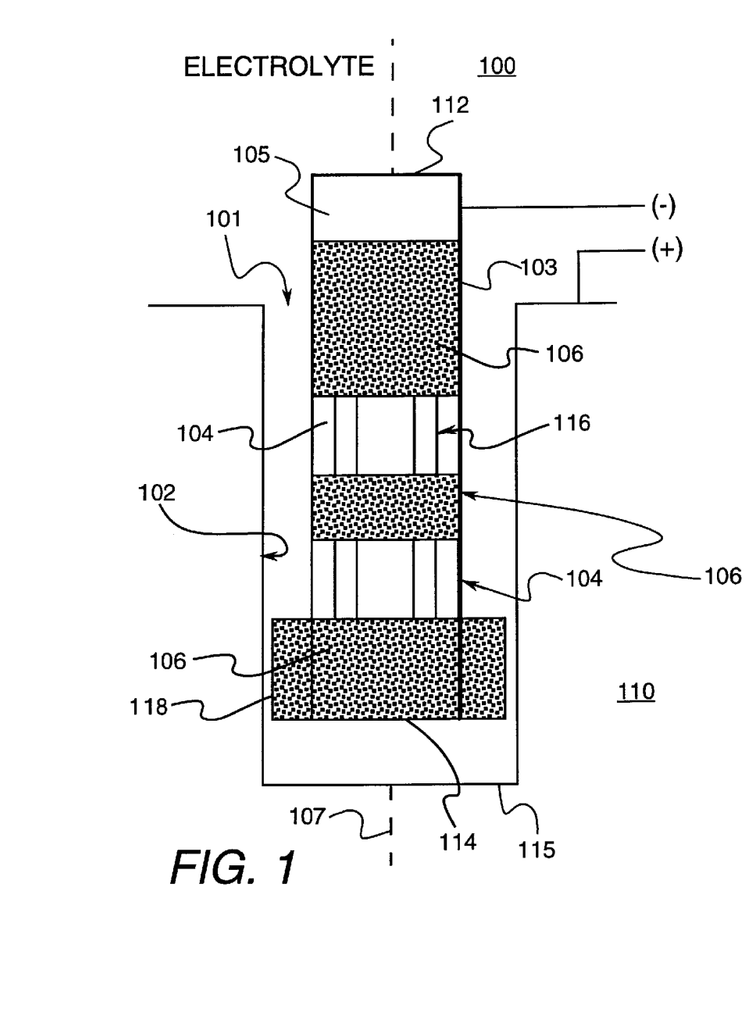
FIG. 1 is a schematic representation of an improved electrode including an electrically conductive cylinder having an insulating surface coating in a pattern designed to machine raised areas or ridges in a predrilled straight-walled hole.
Figure 2:
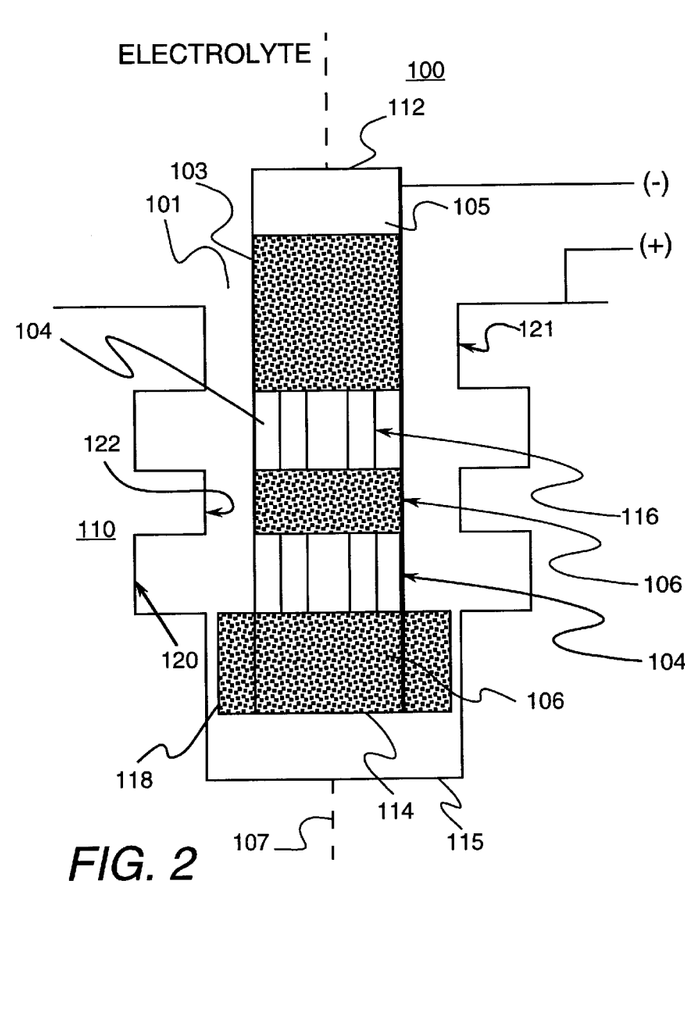
FIG. 2 is a schematic representation of the hole shown in FIG. 1 after the ridges have been formed with the improved electrode.

FIG. 1 depicts a tool comprising an improved shaped-tube electrochemical machining (STEM) electrode 100, made by the process of the present invention, positioned in a predrilled hole 101 with a straight wall 102 of an electrically conductive workpiece 110. FIG. 2 shows the electrode in the same hole after bulbs 120 and intervening raised areas, or ridges 122, have been created. In FIGS. 1 and 2, electrode 100 comprises a cylinder 105 having a hollow electrically conductive body or tube coated with an electrically insulating coating 103 in a pattern leaving areas of exposed metal or conductive material 104 on the exterior surface of electrode 100. The pattern of the insulating coating defines the ridges 122 to be machined in predrilled hole 101. In this embodiment, the pattern of the insulating coating is a series of rings 106 spaced along a longitudinal axis 107. The (+) and (−) designations indicate pulsed voltage through cylinder 105 of electrode 100 and workpiece 110.

As shown in FIG. 2, areas of exposed conductive material 104 on the surface of electrode 100 define areas where bulbs 120 are formed by removal of metal from wall 102. Raised areas or ridges 122 are created in wall 102 where no deplating occurs in the vicinity of the pattern of insulating coating 106 of the surface of electrode 100.

FIG. 2 depicts an embodiment made by the process of the present invention where cylinder 105 includes a hollow tube or body of an electrically conductive material the diameter of which may be as small or as large as necessary to fit the predrilled hole. In one embodiment, for example, the outside diameter of cylinder 105, measured over the coated surface, ranges from about 0.04–0.3 inches with the thickness of insulating coating 103 being about 0.15–0.2 mm thick.

A hollow cylinder 105 allows for pumping of electrolyte solution into predrilled hole 101 through an inlet 112 at an end of electrode 100 extending outside hole 101 and out of an end hole 114 at the other end of electrode 100. Inlet 112 and end hole 114 facilitate uniform electrolyte flow through the areas being machined. Electrode 100 may also have optional electrolyte outlets 116 along the exposed surface of the electrode which may have any desired shape and are shown as rectangles for purposes of example only. Outlets 116 in addition to the end hole 114 may be desirable where relatively large bulbs 120 to be being machined. The size of outlets 116 and/or the portions of cylinder 105 not covered by insulating coating 103 determines the amount of electrolyte supplied to the machining areas, which in turn determines the surface quality of bulbs 120 as well as uniformity of removal of portions of workpiece 110.

FIGS. 1 and 2 illustrate another feature of the improved electrode made by the process of the present invention, locator 118. The function of locator 118 is to position electrode 100 in hole 101 properly, such that the electrode is coaxial with walls 102 of hole 101. In one embodiment, locator 118 comprises the same material(s) as insulating coating 103. The outside diameter of electrode 100 measured at locator 118 is less than the inside diameter of hole 101 and is sufficiently small so that electrode 100 may be easily inserted in hole 101, but sufficiently large so that locator 118 fits snugly therein. Locator 118 is preferably a coating of greater thickness compared to the coating on other parts of the electrode. For example, the thickness of insulating coating 103 may range from about 100–150 micrometers ($\mu$m), while locator 118 may have a thickness ranging from about 200–300 $\mu$m.

Locator 118 typically permits free flow of electrolyte through hole 101 and, if hole 101 has a bottom surface 115, locator 118 is preferably positioned during drilling so as not to contact bottom surface 115. Locator 118 is preferably disposed near the end of electrode 100 inserted in hole 101. Where the cross section of hole 101 is not circular, it may be desirable to provide additional locator(s) at other location(s) along the length of electrode 100 to aid in centering electrode 100 in hole 101.

The operation of a shaped-tube electrochemical machining (STEM) instrument with an improved electrode 100 made by the process of the present invention is similar to that of a conventional STEM electrode. Current is provided by coupling electrode 100 to a negative terminal of the STEM power supply and workpiece 110 to a positive terminal. The improved electrode is placed inside the smooth-walled hole obtained from a previous drilling step. An electrolyte solution which may be the same electrolyte as used in the original drilling step is pumped into an end of hole 101 under pressure. Where the electrode 100 contains outlets 116 for the electrolyte, the solution is pumped into inlet 112 of the electrode. In this embodiment, the electrolyte flows into inlet 112 and out through outlets 116 along the side surface of electrode 100 and end hole 114. For further details of the operation of the improved electrode, reference should be had to aforementioned B. Wei et al., "A Method and Tool for Electrochemical Machining," U.S. application Ser. No. 09/187,663.

Figure 3:
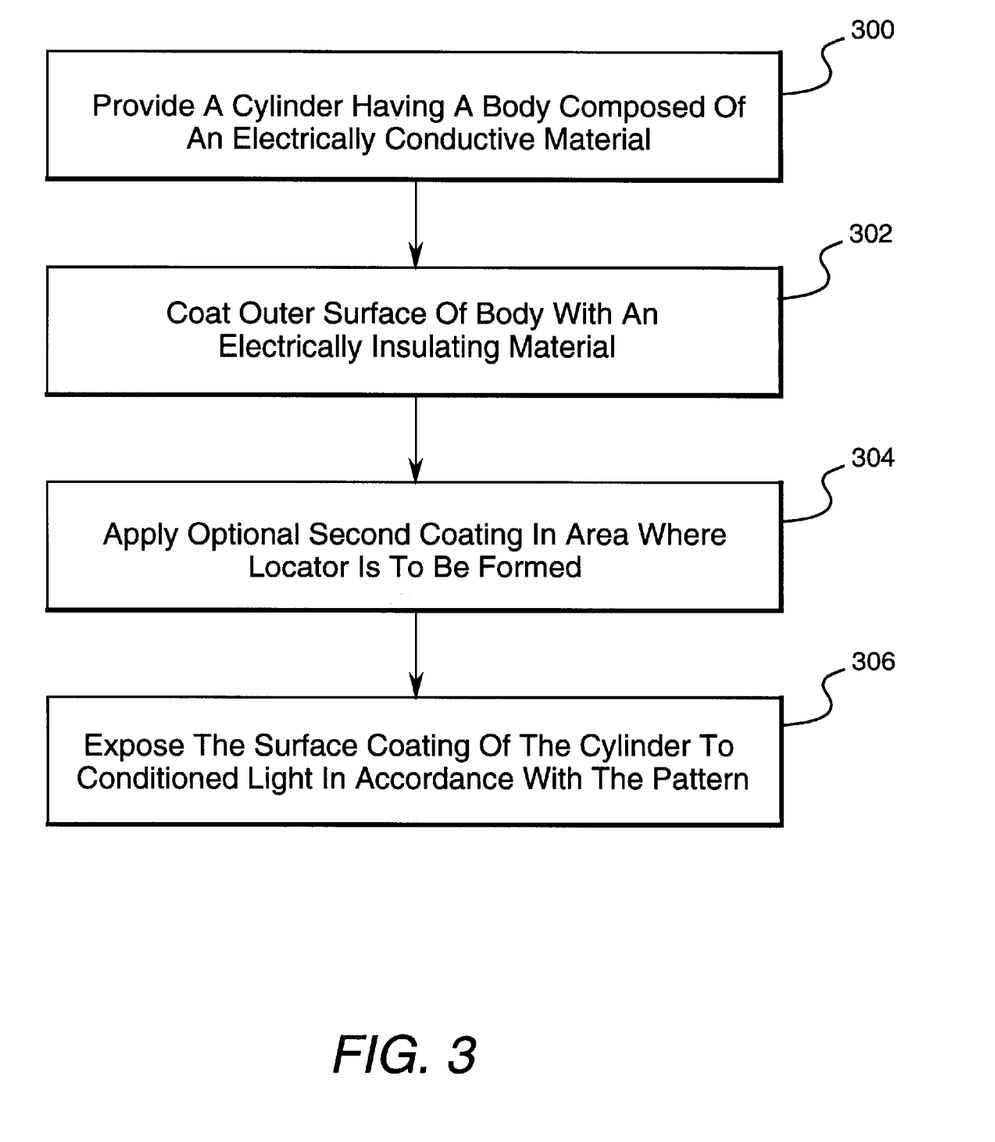
FIG. 3 is a flowchart illustrating a sequence of process steps, in accordance with the present invention.
Figure 4:
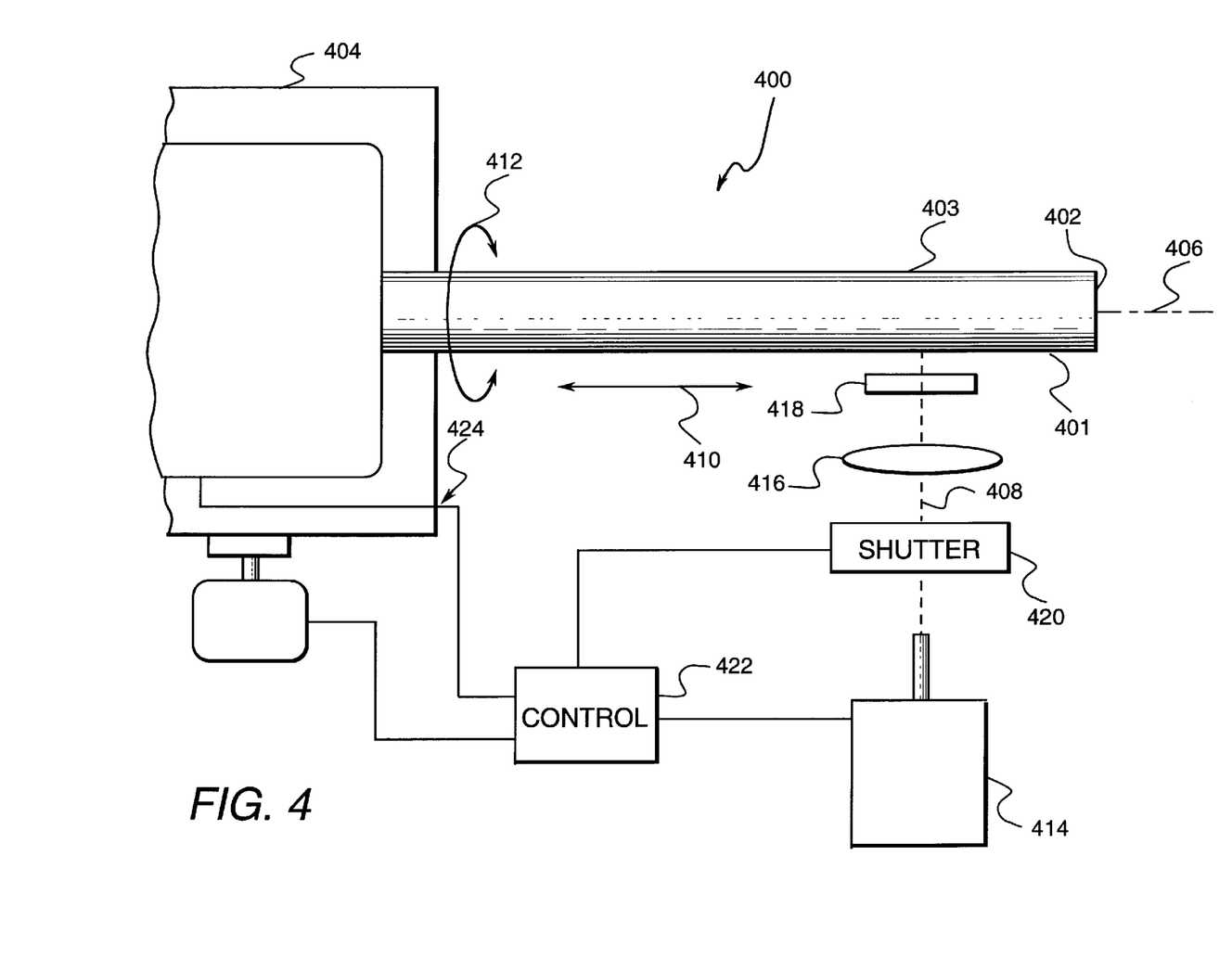
FIG. 4 is a schematic representation of an exemplary apparatus for practicing the process of the present invention.

In accordance with the present invention, electrode 100 is manufactured by selectively removing portions of insulating coating 103 to form the desired pattern by exposing the insulating coating to collimated light (shown as light beam 408 in FIG. 4). The process is illustrated in the flow diagram in FIG. 3 and the schematic representations of FIGS. 4 and 5.

At step 300 of the inventive process, cylinder 402 is provided with a body comprising an electrically conductive material which may be solid or hollow. Titanium metal is preferred for the body of cylinder 402 because titanium is resistant to electrolytic action. Cylinder 402 may be formed by extrusion or any other known technique. The outer surface of cylinder 402 is then coated with an electrically insulating coating 403 at step 302 which may be applied by spray or dip coating or any other known technique. Insulating coating 403 is preferably smooth, of even thickness, tightly adhered to cylinder 402, and free of pinholes or foreign material. In addition to possessing these properties, insulating coating 403 should be resistant to attack by the electrolyte solutions used in the STEM process, typically at elevated temperature. For example, the electrolyte may be applied to cylinder 402 at temperatures ranging from about 18 to 32° C. The electrolyte is usually an aqueous acid. Exemplary acids used in an electrolyte solution for a STEM instrument are nitric acid, sulfuric acid, hydrochloric acid, and mixtures thereof, at a concentration of about 16–18% by volume. Exemplary electrically insulating or dielectric materials suitable for insulating coating 403 of the present invention include polyethylene, polytetrafluoroethylene, ceramics, and rubbers.

At optional step 304 optional locator 118 (shown in FIGS. 1 and 2) can be formed, for example, by selectively applying a second coating of insulating material to an area by spraying or dip coating or any other of conventional coating method. Locator 118 may have the same composition as insulating coating 403, or may have a different composition. It is desirable that the locator 118 include a material which is resistant to the electrolyte solution and that adhesion between the coating 403 and locator 118 be sufficient to withstand exposure to the electrolyte solution under operating conditions without delaminating.

At step 306, a desired pattern is then formed in insulating coating 403 by exposing insulating coating 403 to collimated light (shown as light beam 408 in FIG. 4). The pattern of insulating coating 403 defines ridges 122 (FIG. 2) to be machined in predrilled hole 101 (FIGS. 1 & 2). A preferred pattern is a series of rings or bands 106 (FIGS. 1 and 2) circumferentially disposed on the external surface of electrode 100 (FIGS. 1 and 2). However, the present invention contemplates employing any pattern configuration desired. Examples of other configurations which may be employed are steps or staircases, one or more spirals or helices, or rings or bands. The geometric components of the pattern may be longitudinally disposed along the external surface of the electrode, and disposed either orthogonally or obliquely relative to longitudinal axis 406.

Figure 7:
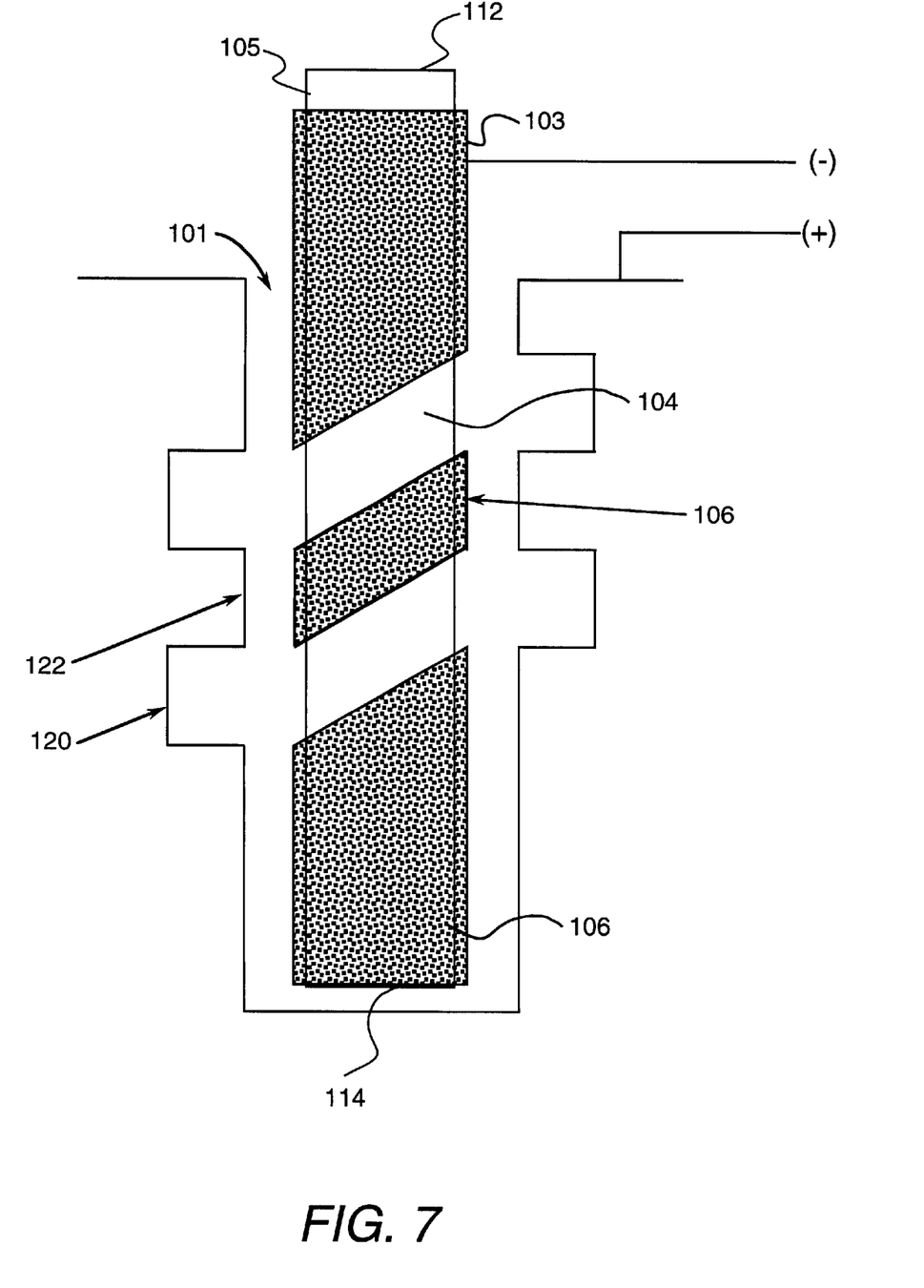
FIG. 7 is a schematic representation of an electrode having an insulating coating patterned in a spiral configuration.

Exemplary apparatus 400 shown in FIG. 4 may be used in patterning step 306 of the electrode fabricating process of the invention. Referring to FIG. 4, apparatus 400 includes an electrode 401 including electrically conductive cylinder 402 with electrically insulating coating 403 which may be mounted on a computer numerically controlled (CNC) manipulator 404 for rotation about and/or translation along a longitudinal axis 406 relative to beam 408 of collimated light in order to scan or pass light beam 408 over insulating coating 403. Manipulator 404 includes a fixture for holding cylinder 402 for translation under light beam 408 parallel to longitudinal axis 406 along scanning direction 410 as illustrated by the double headed arrow in FIG. 4 and for rotation about longitudinal axis 406 as illustrated by arrow 412. The rotation and translation can be useful for creating complex shapes in insulating coating 403 such as the spiral shape shown in FIG. 7.

A source 414 of collimated light, which may comprise a laser or another collimated light source, is positioned so that light beam 408 is directed to cylinder 402. A focusing objective 416 can be adjusted to focus light beam 408 on insulating coating 403 of cylinder 402. A pattern is chosen and a variable aperture 418 is adjusted to narrow light beam 408 to the desired dimensions. The geometric shape and dimensions of the beam are defined by variable aperture 418. A shutter 420 may be used to interrupt the beam. Apparatus 400 may be operated by a control unit 422, or may be manually operated. A drive 424 associated with manipulator 404 rotates and translates cylinder 402 in a controlled manner to cause light beam 408 to trace a desired pattern on insulating coating 403. Light beam 408 may be interrupted by a shutter 420 or by turning off the laser power at those times when it is desired to skip from one point to another without removing insulating coating 403 therebetween.

In one embodiment, direct writing can be used for patterning by shaping light beam 408 to expose selected areas of insulating coating 403 to form the desired pattern. Methods of direct writing include using a single beam, using a multiple beam, and using a surrounding beam, for example. Several alternative types of direct writing can be used. For example, cylinder 402 may be mounted in a device, (not shown) similar to one used for laser wire stripping, and having one or more mirrors positioned so as that the reflected beam may impinge on all selected areas of the surface coating simultaneously. Rotation or translation of cylinder 402 may not be required when such a device is employed. As another example, apparatus 400 may include an holographic lens (not shown) which causes the beam of light to be spread in a predetermined pattern along the longitudinal axis 406 of cylinder 402. The need for translation of the workpiece may be avoided by using such a lens, or one which produces similar spreading of the beam.

Figures 5, 6:
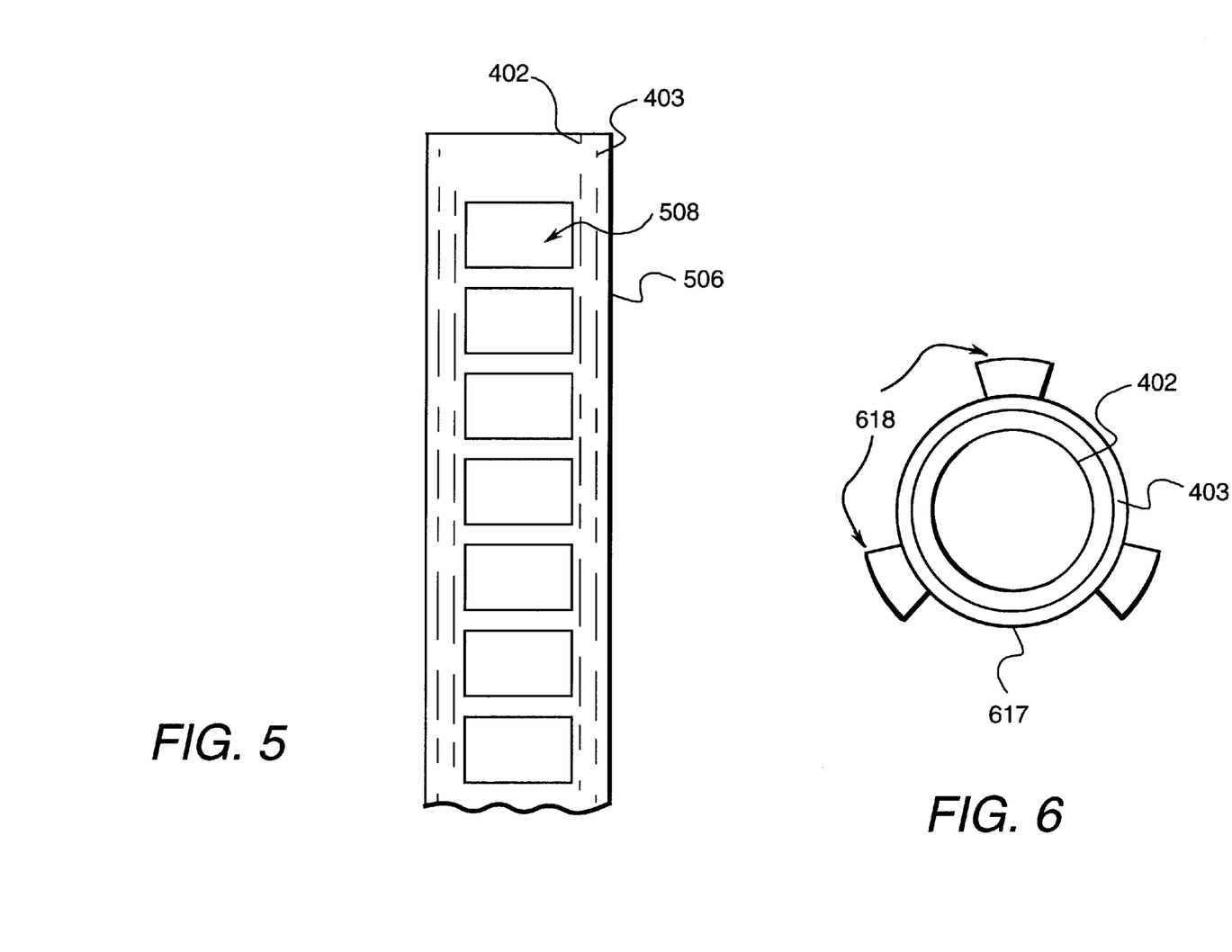
FIG. 5 is a view of an electrically conductive cylinder, an insulating surface coating over the electrically conductive cylinder, and a photomask for protecting the portions of the coating to be left on the cylinder.
FIG. 6 is a bottom view of an electrically conductive cylinder, an insulating coating, and a patterned locator.

As another alternative, a photomask may be applied to insulating coating 403 before mounting cylinder 402 in manipulator 404, and the exposure may be done through the photomask, if desired. FIG. 5 illustrates cylinder 402, insulating coating 403, and a photomask 506 which defines an area 508 of insulating coating 403 to be irradiated and protects the remainder of insulating coating 403 which is to be left on cylinder 402. Photomask 506 should therefore be opaque to be irradiated to the wavelength of light used for the exposure. Photomask 506 may be conformal or nonconformal. An example of a conformal photomask is a concentric cylinder surrounding cylinder 402 and insulating coating 403. An exemplary nonconformal photomask is a flat sheet of metal or glass. In one embodiment, photomask 506 comprises a commercially available combination of transparent glass with an opaque pattern. In another embodiment, photomask 506 comprises a metal foil stencil.

Regardless of which of the above techniques is selected for patterning, light beam 408 is preferably scanned across insulating coating 403 in a scanning direction 410 which is substantially perpendicular to the direction of the light beam 408 to provide substantially complete coverage according to the desired pattern.

In one embodiment of the invention, step 306 of exposing insulated coating 403 to light beam 408 comprises scanning a light beam 408 from a light source 414 comprising a laser across insulating coating 403 with the exposure resulting in ablation of the coating in accordance with a desired pattern. Ablation refers to a physical and chemical process of material removal which may include a combination of melting, vaporization, sublimation, or high temperature chemical reactions, among other processes.

When light source 414 comprises a laser, light beam 408 may be conditioned to selectively ablate insulating coating 403 and/or the underlying metal of cylinder 402. Conditioning refers to the process of selecting an appropriate light source 414 having the properties necessary to effect selective exposure of insulating coating 403 and setting the necessary parameters in order that the desired pattern is produced. These properties include wavelength, power, fluence and geometrical shape. The wavelength of the light should match the absorption of the material exposed. For example, most polymers absorb light of 248 nanometers (nm), and a laser having light of wavelength 248 nm is capable of ablating most polymers. The power should be sufficient to form the pattern. Fluence is defined as the intensity of the beam, or energy of the beam per unit area. Geometrical shape refers to the cross-sectional shape of the beam and determines the two-dimensional shape of the area of exposed material.

An insulating coating 403 which is to be subjected to ablation may comprise any material which is electrically insulating, resistant to attack by the electrolyte, and which absorbs light of the same wavelength as the light source. When light source 414 comprises a pulsed excimer laser, such lasers typically emit a beam at 193 nm, 248 nm or 308 nm. Other types of lasers, such as $CO_2$ or YAG may also be used. In this respect, an excimer laser which emits a beam at 248 nm is particularly suitable for use with the method of the invention, as most polymeric materials which are useful as coatings absorb at that wavelength.

A fixed laser pulse of sufficient fluence results in the ablation of a fixed quantity of material from insulating coating 403. Each pulse to which insulating coating 403 is exposed ablates the same quantity of material for a uniform coating. Therefore, the amount of material removed, and ultimately, the thickness of the remaining coating is determined by the number of pulses to which insulating coating 403 is exposed. For an organic polymer coating, 0.3–0.4 $\mu$m per pulse are typically removed, although the amount of removal may vary with different coatings, different compositions of the coating, depth of the coating, and type of laser and conditioning of the beam.

In addition to being used for patterning insulating coating 403, light source 414 and the embodiment of FIG. 4 can be used to form and/or pattern locator 118 of FIG. 1. In an embodiment wherein locator 118 was formed by applying a coating of insulating material over insulating coating 103, a pattern for the locator may be selected, and a laser beam appropriately conditioned to remove predetermined sections of material of locator 118 to produce a patterned locator.

For example, as shown in FIG. 6, a three-armed locator 618 at an end of cylinder 402 may be formed by dipping cylinder 402 in a solution or dispersion of a suitable coating material, before or after a pattern is formed on the insulating coating 403 and drying the coating material. After the coating material is set, the cylinder may be exposed to a conditioned laser such that the coating is selectively ablated in areas 617 in a pattern to form locator with arms 618. Typically, at least insulating coating 403 will remain on cylinder 402 to insulate the cylinder and prevent metal depleting in that area. In another embodiment, the entire surface of cylinder 402 can be coated with an insulating coating layer sufficiently thick to form locator 118 with the laser additionally being used to reduce the thickness of insulating coating 403 in areas where locator 118 will not be positioned.

Likewise, outlets 116 (FIGS. 1 and 2) for the electrolyte solution may be formed in the body of cylinder 402 by exposure to light source 414 such as a laser. As an example, cylinder 402 and insulating coating 403 may be exposed to a laser beam conditioned to remove first insulating coating 403 where it is desired to form an outlet and then perforate the underlying metal of the body. Using this method, an opening is formed in the body of the cylinder which may function as an outlet for the electrolyte solution. An alternative to using light source 414 to form outlets 116 is to use an electrical discharge machine, for example.

As an alternative to direct laser ablation, light source 414 may be used to selectively expose an insulating coating 403 comprising a photosensitive material. Several classes of photosensitive, electrically insulating materials which are stable to the acid electrolyte used in the electrochemical machining process are commercially available and may be used as insulating coating 403. These materials include pre-imidized and precursor polyimide resins, B-staged bis-benzocyclobutene (BCB) and photosensitive epoxy-based resins. The materials may be applied by spray coating or dip coating, followed by an optional low temperature bake to remove solvent.

Either direct laser writing or a photomask process may be applied to insulating coating 403, with light beam 408 then being used to produce a pattern of exposed material in insulating coating 403. Insulating coating 403 may then be developed in a suitable developer to remove insulating coating 403 in predetermined areas to thereby reveal the underlying electrically conductive cylinder 402. This process may use either positive acting photosensitive materials, in which material is removed during development in areas exposed to light, or negative acting photosensitive material, in which material is removed during development from areas which were not exposed to light. Developers for both positive and negative processes are well known in the art.

As used herein the terms cylinder and cylindrical body include elongated members having cross sections which are not necessarily circular. In addition, the term light includes not only ultraviolet light, but also visible and infrared light. Further, various means of scanning a beam of light across the surface of the cylinder are contemplated, including holding the cylinder stationary while translating the light source. Therefore, these and similar modifications, additions and substitutions are considered to be within the scope of the invention as defined in the following claims.

What is claimed is:

1. A process for patterning a shaped-tube electrochemical machining (STEM) tool comprising;

providing an electrically conductive STEM cylinder coated by an electrically insulating coating; and exposing the insulating coating to a source of collimated light in accordance with a pattern defining raised areas to be formed on an internal surface of a predrilled hole in a workpiece.

2. The process of claim 1 wherein the light source comprises a laser.

3. The process of claim 2 wherein exposing the insulating coating to the laser results in selective ablation of the insulating coating in predetermined areas.

4. The process of claim 3 wherein the insulating coating comprises a laser ablatable polymer and wherein the laser is selected to provide a light beam having a wavelength capable of ablating the insulating coating.

5. The process of claim 3 wherein providing the cylinder coated by the insulating coating includes:

coating the insulating coating on the cylinder, and applying a locator around a portion of the cylinder.

6. The process of claim 5 wherein the locator comprises an electrically insulating material and further including exposing the locator to the laser to selectively ablate areas of a predetermined thickness.

7. The process of claim 3 wherein exposing the insulating coating to the laser results in complete removal of the insulating coating in the predetermined areas and further including exposing the cylinder to the laser in at least one of the predetermined areas to form at least one outlet in the cylinder.

8. The process of claim 2 wherein exposing the insulating coating to the laser includes rotating or translating the cylinder.

9. The process of claim 1 wherein exposing the insulating coating to the light source includes rotating and translating the cylinder.

10. The process of claim 1 further including positioning a photomask) between the insulating coating and the light source prior to exposing the insulating coating to the light source.

11. The process of claim 10 wherein the insulating coating comprises a photosensitive polymer or an ablatable polymer.

12. The process of claim 10 wherein the insulating coating comprises a photosensitive polymer and further including, after exposing the insulating coating to the light source, additionally developing and removing the insulating coating in predetermined areas.

13. The process of claim 12 wherein the insulating coating comprises a pre-imidized polyimide resin, a precursor polyimide resin, a B-staged bisbenzocyclobutene (BCB) resin, or a photosensitive epoxy-based resin.

14. The process of claim 1 wherein the cylinder is hollow and comprises titanium.

15. The process of claim 1, wherein the insulating material comprises polyethylene, polytetrafluoroethylene, a ceramic, or a rubber.

16. The process of claim 1 wherein the desired pattern is comprised of a plurality of rings.

17. A process for patterning a shaped-tube electrochemical machining (STEM) tool comprising;

providing an electrically conductive STEM cylinder coated by an electrically insulating coating; and laser ablating the insulating coating in accordance with a pattern defining raised areas to be formed on an internal surface of a predrilled hole in a workpiece.

18. The process of claim 17 wherein laser ablating the insulating coating results in complete removal of the insulating coating in predetermined areas and further including exposing the cylinder to the laser in at least one of the predetermined areas to form at least one outlet in the cylinder.

19. The process of claim 17 further including rotating or translating the cylinder while laser ablating the insulating coating.

* * * * *